Sept. 5, 1961   W. H. DAILEY, JR., ET AL   2,998,967
COIL SEPARATOR

Filed April 4, 1957   2 Sheets-Sheet 1

INVENTORS
WILLIAM H. DAILEY, JR
BY JOHN J. TURIN
Charles S. Haughey

INVENTORS
WILLIAM H. DAILEY, JR.
BY JOHN J. TURIN

United States Patent Office 2,998,967
Patented Sept. 5, 1961

2,998,967
COIL SEPARATOR
William H. Dailey, Jr., and John J. Turin, Toledo, Ohio, assignors, by mesne assignments, to Midland-Ross Corporation, Cleveland, Ohio, a corporation of Ohio
Filed Apr. 4, 1957, Ser. No. 650,658
3 Claims. (Cl. 263—47)

This invention relates generally to apparatus for annealing a stack of cylindrical coils of flat material such as steel strip and more particularly to gas circulating separators for use in coil annealing furnaces.

In considering the problems involved in the heating of a stack of coils, it should be appreciated that there are two distinct heat transfer processes involved in heating or cooling the coil charge.

Radiation heat transfer occurs primarily between the inner surface of the protective or inner cover and the outer wraps of the coils. The rate of heating by radiation heat transfer is severely limited by the rate of heat transfer from the outer wraps of the coils to the center thereof. It has long been recognized that radial heat flow through the laminations of a strip coil is relatively slow as compared to the heat flow parallel to the laminations heated from the edges and it has been proposed to provide channel separators between the coils to permit heat to be applied to the edges of the coils by heat carried by gases flowing through the channels of said separators.

Convection heat transfer delivers heat energy primarily to or from the coil ends adjacent the work separators used in a preferred arrangement. Since convection heat transfer depends upon wiping heat off a protective inner cover and delivering it to the coils adjacent a separator, a proper design of a coil separator is required to obtain maximum benefit.

Experimental work to date has indicated that the results secured with coil separators may vary considerably with the design of the separator, and various improvements have been suggested to secure both maximum utilization of available fan circulation and optimum uniformity of heat distribution between the inside and outside of the coil by control of the shape and cross section of the gas flow passages.

Separators of the usual design comprise at least one series of generally radial and spaced apart ribs. Gas circulates through the spaces between the ribs to the interior of the stack at the coils. With separators of this type there is a tendency for the exiting gases to co-mingle in a manner which creates turbulence and deters the circulation of the gases down through the interior of the stack. In order to secure maximum utilization of available fan circulation, the separator of the present invention may include means to overcome this objection by providing directional deflectors, which may be in the form of nozzles, to initiate the downward flow of the gases at the interior of the stack and thereby inhibit turbulence of the circulating gases.

As a further inhibitor of turbulence in the preferred construction of the invention two planular series of ribs are provided to emit two series of gas streams in contra rotation to each other. One series of ribs are inclined so that the gas flow tends to be in a clockwise direction, the other series of ribs are inclined in the opposite direction so that the flow tends to be counter clockwise. The vortex effect of these two flows are effectively cancelled so that the flow inward is essentially radial. Such radial flow offers the least resistance to the downward flow of the gases through the interior of the stack.

It is recognized that prior separators have employed two planular series of curved ribs, with the ribs of one series extending generally in a clockwise direction and the ribs of the other series extending generally in a counter clockwise direction (Pat. No. 2,678,815 Radlinski). Such prior separators do not have a radiation plate intermediate the two series of ribs; therefore, turbulence of the heating gases occurs between the two planular series which impedes the additional flow of gases and thereby deters uniform heating of the adjacent coils.

If the coil separators are considered as heat exchangers in operation with a given volume of fan circulated gas, the amount of heat transfer by convection becomes limited. The heat transfer to the coils by means of the separators can then be best modified by increasing the amount of heat transferred by radiation. Therefore, it is desirable for maximum overall heat transfer to obtain the highest heat transfer possible by radiation.

Curved vanes have been employed heretofore in various designs of separators to provide uniform flow of gases. An advantage provided by such curved vanes is added structural strength over straight radial vanes. However, a disadvantage concomitant with such curved vanes is that they obstruct radiant heat transfer from the inner cover toward the central portion of the stack coils. It is accordingly an object of the present invention to provide a separator of novel rib design and construction which will assure improved results in stacking annealing by permitting greater heat transfer to the edges and central portion of the coils by radiation and yet provide more surface area and reinforcement than that afforded by straight radial vanes.

The separator of this invention provides an emission passage for radiant heat transfer from the outer periphery of the separator assembly to the center thereof by the particular arrangement of the ribs whereby a portion of the projection of the space between the inner ends of two adjacent ribs to the outer periphery is unobstructed by any portion of the said vanes.

For further consideration of what we believe to be novel and our invention, refer to the attached drawing, and the specification and claims.

Figure 1:
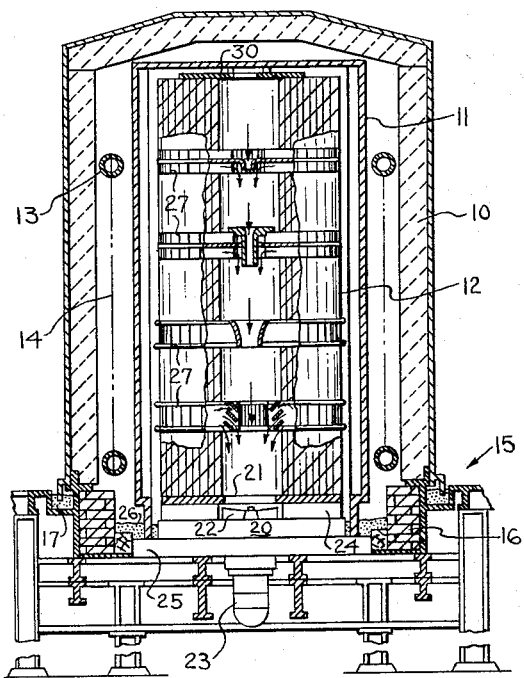
FIG. 1 is a vertical sectional view of a typical annealing furnace for annealing a cylindrical column of sheet or strip metal including separators embodying nozzles of several different forms.
Figure 3:
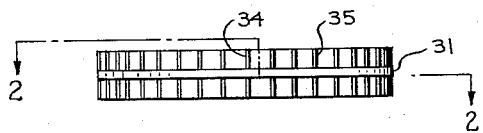
FIG. 3 is an elevational view of the separator shown in FIG. 2.

The annealing furnace shown in FIG. 1 comprises a portable heating hood 10 for heating a bell-type muffle 11 disposed over a cylindrical column of coils 12 of sheet steel which is to be annealed. (It will be understood that the thickness of the laminations of the coils have been greatly exaggerated for illustrative purposes). For purposes of description the source of heat carried by the heating hood will ordinarily comprise internally-fired radiant tubes 13 distributed along the side walls of the hood. For simplicity of illustration only the upper and lower tubes are shown but as indicated by the vertical connecting line 14 there will be additional tubes therebetween.

The base of the furnace is generally indicated at 15 and comprises an upstanding peripheral wall 16 on which the heating hood 10 is seated, the seat being surrounded by a conventional sand seal 17. The furnace base also comprises a stand 20 for supporting the column of coils 12, the stand being shown in elevation except for the top plate 21 which is in section. This top plate has a central aperture coaxial with a circulating fan 22 which is driven by a motor 23 carried by the underside of the coil stand. The top plate 21 is spaced from the lower portion of the coil stand by radial spacers 24 whereby to provide radial gas passages below said plate for the gas circulated by the fan 22. The muffle or inner cover 11 is shown as supported on a ledge 25 which surrounds the coil stand and the foot of the muffle is shown as surrounded by a layer of granular sealing material 26 to prevent objectional leakage of gas from the muffle, it being understood that some seepage of gas from the muffle is not objectional but rather desirable. A non-oxidizing gas is supplied to the muffle by a supply pipe not shown but which extends through the coil stand 20 from below.

From the foregoing it will be readily understood that unless the coils are spaced apart to provide gas passages therebetween all of the gases circulated by the fan 22 must enter at the top of the coil stack for downward flow therein. In FIG. 1, the coils are spaced apart by channel separators 27 and an orifice plate 30 is placed on top of the coil stand. The purpose of the orifice plate 30 is, of course, to restrict the entry of circulated gas to the inside of the stack by way of the top thereof whereby to cause part of the circulated gases to flow laterally inward through the gas passages in the coil separators.

The channel separators 27 provide horizontal tiers of passages for improved distribution of heat by permitting the largest amount of radiant heat energy to flow from the muffle 11 toward the interior of the coil stack 12.

Figure 2:
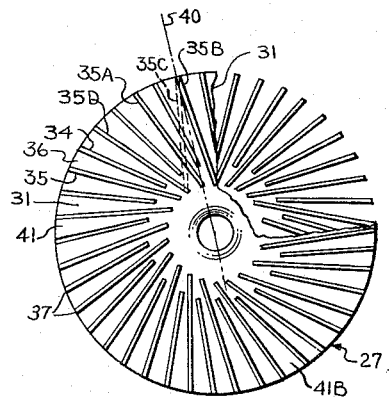
FIG. 2 is a plan view, partially broken away to show the bottom ribs, of the improved coil separator.

The preferred embodiment of the invention comprises an apertured annular plate 31 and a series of longitudinally straight ribs or vanes 34 and 35 secured to both the top and bottom side of the plate 31. The short vanes 34 and the long vanes 35 are alternately disposed in a circular fashion about the plate 31 and terminate in confronting faces 37 at the radial exterior of the separator 27. As may be observed in FIG. 2 the ribs on one side of the plate 31 extend outwardly from the inner periphery thereof and are inclined from a radial plane in a direction generally clockwise. The ribs on the opposite side of the plate also extend outwardly from the inner periphery thereof but are inclined in a generally counterclockwise direction.

As a minimum the angle at which the ribs are inclined is such that the inside end of one long vane 35A and the outside end of the next adjacent long vane 35B fall on the same radial plane 40 of the separator. Such relationship insures that any radiant heat transferring in the passage 41 defined by two adjacent ribs will not continue to flow through the passage 41B diametrically opposite said passage. The relationship also insures that the space between the ribs on one side of the plate is supported by a rib 35C on the opposite side of the plate. In the preferred embodiment the ribs are spaced and inclined so that the rib 35C extends from the outer end of a first rib 35A on the opposite side of the plate to the inside end of the second rib 35D away from said first rib 35A. This arrangement provides an angle about twice that required as a minimum to prevent one passage "looking through" a diametrically opposing passage.

In practice, it is common to transfer the separators from one base to another by two-point contact transfer means. Unless the separators are of sufficient rigidity there is a tendency for the annular plate 31 to bend whenever the separators are lifted. The cross construction of the vanes on opposite sides of the plate not only provides a means of increasing the rigidity of the separator in a manner to overcome bending when lifted without having to substantially increase the thickness of the plate 31 but also provides additional bearing surfaces for the coils to rest upon.

The use of alternately disposed short and long ribs also affords a means of increasing the bearing area at the perimeter of the separator to accommodate the increased area and weight of a coil at its outer perimeter. The economy in manufacturing cost of straight vanes as compared to vanes having progressively increasing horizontal cross sectional area is self evident.

Figure 4:
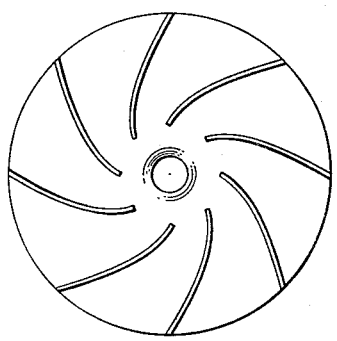
FIG. 4 is a plan view of a coil separator similar to that of FIG. 2, but having curved ribs.

While straight vanes are preferred, curved vanes generally constructed and arranged in a manner as shown in FIG. 4, whereby their inner ends may "look at" the outer periphery of the separator may also be employed without deviating from the scope of the invention.

The vanes 34 and 35 are spaced so that portions of a projection of the space between the inner ends of the vanes 35 are unobstructed or can "look at" the periphery 36 of the separator and hence can "look at" the inner cover or muffle 11. The provision of such an "open" passage facilitates the transfer of radiant heat from the inner cover 11 to the edges of the coils. A horizontal cross-section of a passage between such inclined ribs is substantially one of frusto-conical shape which serves to progressively diminish the radiant heat transfer from the perimeter to the interior of the separator and hence has a radiant heat regulating effect on the edges of the coils, that is, as the area of the coil decreases the radiant heat transfer decreases.

Figure 5:
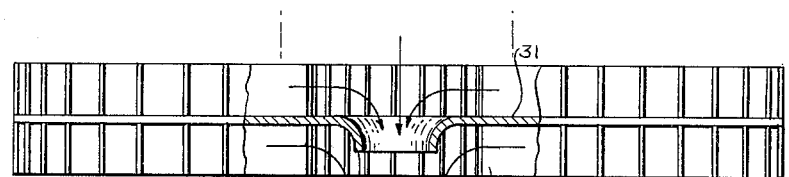
FIG. 5 is a cross sectional view of one form of nozzle of this invention shown as an integral part of a separator.

The preferred embodiment also provides means for initiating the flow of the gases from the passages 41 downwardly into the central interior of the coil separator or coil stack. Such means may be in the form of a deflector 42 formed by welding a flared annular ring adjacent the central aperture of the plate 31. However, it is preferred that the flow from both planular series of passages be diverted downwardly. This may be accomplished by providing a deflector which extends from the top of the separator as shown in FIG. 5. Such deflector may be effectively employed in separators that utilize a single planular series of passages or multiple planular series of passages. By diverting the radial flow of the circulating gases interference with the downward flowing gases is lessened; thereby increasing the effective circulation rate for a fan of a given capacity.

Figure 6:
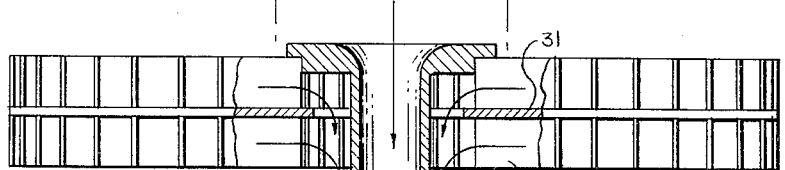
FIG. 6 is a cross sectional view of an insertable nozzle, adaptable for use with existing separators.
Figure 7:
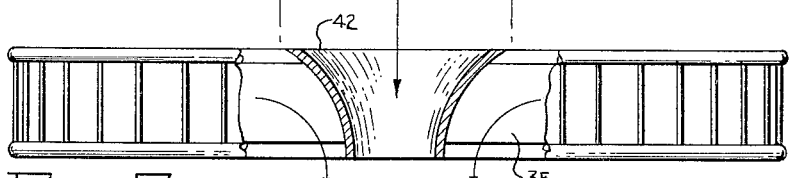
FIG. 7 is a cross sectional view of a separator comprising a single series of ribs secured together at their inner ends by a nozzle and at the outer ends by a pair of annular rings.
Figure 8:
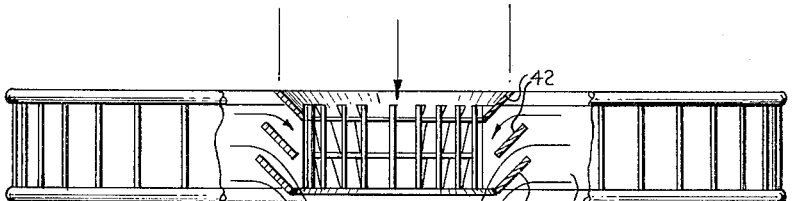
FIG. 8 is a cross sectional view of a separator indicating how a plurality of turning vanes may be employed in a single separator.

It will readily be apparent that the advantage of improved circulation of the subject invention may be attained with existing separators employed in furnaces utilizing forced circulation by inserting a deflector of the type as shown in FIG. 6 with little or no modification of the separators being necessary.

Figure 9:
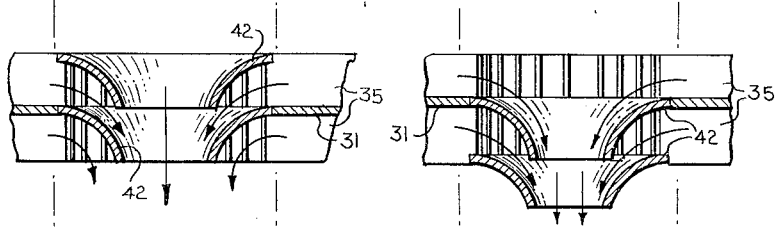
FIG. 9 is a fragmentary cross sectional view of a single separator employing nozzles at the top and middle of the separator.
Figure 10:
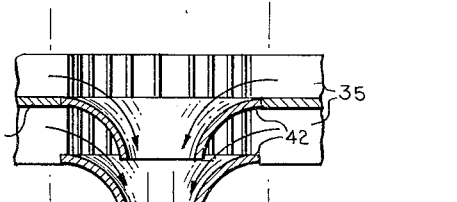
FIG. 10 is a fragmentary cross sectional view of a single separator employing nozzles at the middle and bottom of the separator.

In a two tier separator where two deflectors are employed, the construction of FIG. 10 is preferred for best directional flow; however, for ease in handling, the construction of FIG. 9 is preferred. Portions of the nozzles that extend beyond a surface of the separator proper interfere with handling when transferring from one furnace to another. Insertable deflectors, as shown in FIG. 6 do not present this problem.

The combination of the deflector with the edge of a coil defines a nozzle which may be effectively employed to compensate and control the distribution of heat by varying the relative volumes of gases that flow through the individual tiers of the stacks of coils. The volume of gases flowing through a particular separator may be varied by sizing the nozzle, that is, by selecting the diameter and/or length of the depending deflector. The distribution is controlled by providing a nozzle which permits the circulation of the largest volume of gases through the tier of passages where the greatest compensating concentration of heat is desired or required and by providing a nozzle which permits the circulation of a lesser volume of gases through the tier of passages where less concentration of heat is desired.

The advantages of the invention in simplicity and ease of manufacture and increased radiant and convective heat transfer will be apparent to those skilled in the art from the foregoing description of the preferred embodiment of the invention. It will also be apparent to those skilled in the art that modifications of the structure for maintaining the vanes in the desired spaced and assembled relationship may be made without departing from the principles and scope of the invention which is primarily concerned with the particular design and arrangement of the ribs or vanes and the provision of a directional deflector. The advantage obtained by "sandwiching" an annular plate between two planular series of ribs is that any heat directed to the plate is radiated to the coils from the plate.

We claim:

1. A coil separator for insertion between the individual coils of a vertical stack of coils which are to be heated in an annealer employing an inner cover and a forcibly circulated atmosphere, comprising in combination: a plurality of longitudinally straight ribs aligned in a circular pattern, each of said ribs having a confronting face which is generally radially exterior of the separator and having longitudinally-extending faces which are directed generally toward an opening in the center of said separator in a direction which deviates from a radial plane of the separator, and each of the longitudinally-extending faces being exposed throughout its entire length to radiant heat emitted by the inner cover; and means for maintaining the ribs in spaced and assembled relationship to provide a series of passages for circulating gases and adapted for the straight line transmission of radiant heat from the inner cover toward the opening in the center of said separator.

2. The coil separator as described in claim 1, wherein the ribs are inclined in a horizontal plane such that at least a portion of the inside end of one rib and the outside end of the next adjacent rib extend through a portion of the same radial plane of the separator.

3. A separator as described in claim 1, comprising at least one annular vertically depending flange adjacent inner ends of said ribs, being disposed in a manner to direct the circulated atmosphere from series of passages defined by said ribs downwardly through the center of said stack of coils.

References Cited in the file of this patent

UNITED STATES PATENTS

| 2,073,724 | Baker | Mar. 16, 1937 |
| 2,600,094 | Cone | June 10, 1952 |
| 2,671,656 | Winder | Mar. 9, 1954 |
| 2,678,815 | Radlinski | May 18, 1954 |
| 2,731,254 | Campbell et al. | Jan. 17, 1956 |

FOREIGN PATENTS

| 755,034 | Great Britain | Aug. 15, 1956 |